US008912115B2

(12) United States Patent
Olken et al.

(10) Patent No.: US 8,912,115 B2
(45) Date of Patent: Dec. 16, 2014

(54) METHOD FOR PREPARING A HETEROGENEOUS, HIGH-ACTIVITY PLATINUM-CONTAINING, SUPPORTED HYDROGENATION CATALYST

(75) Inventors: Michael M. Olken, Midland, MI (US); Edward M. Calverley, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 478 days.

(21) Appl. No.: 12/991,771

(22) PCT Filed: May 8, 2009

(86) PCT No.: PCT/US2009/043304
§ 371 (c)(1),
(2), (4) Date: Nov. 9, 2010

(87) PCT Pub. No.: WO2009/142926
PCT Pub. Date: Nov. 26, 2009

(65) Prior Publication Data
US 2011/0065572 A1    Mar. 17, 2011

Related U.S. Application Data

(60) Provisional application No. 61/055,254, filed on May 22, 2008.

(51) Int. Cl.
| *B01J 21/00* | (2006.01) |
| *B01J 35/00* | (2006.01) |
| *B01J 23/40* | (2006.01) |
| *B01J 23/42* | (2006.01) |
| *B01J 23/44* | (2006.01) |
| *B01J 23/648* | (2006.01) |
| *B01J 23/656* | (2006.01) |
| *B01J 23/74* | (2006.01) |
| *B01J 37/18* | (2006.01) |
| *C10G 45/52* | (2006.01) |
| *B01J 35/10* | (2006.01) |

(52) U.S. Cl.
CPC .............. *B01J 35/0066* (2013.01); *B01J 23/40* (2013.01); *B01J 23/42* (2013.01); *B01J 23/44* (2013.01); *B01J 23/6484* (2013.01); *B01J 23/6567* (2013.01); *B01J 23/74* (2013.01); *B01J 37/18* (2013.01); *C10G 45/52* (2013.01); *B01J 35/1014* (2013.01); *B01J 35/1042* (2013.01); *B01J 35/1047* (2013.01); *B01J 35/1061* (2013.01); *B01J 35/1066* (2013.01)
USPC ........... 502/241; 502/246; 502/248; 502/250; 502/254; 502/255; 502/258; 502/262

(58) Field of Classification Search
USPC ......... 502/241, 262, 246, 248, 250, 254, 255, 502/258
See application file for complete search history.

(56) References Cited

U.S. PATENT DOCUMENTS

| 2,623,860 | A | * | 12/1952 | Haensel .................... 502/230 |
| 3,216,922 | A | * | 11/1965 | O'Hara ...................... 208/111.3 |
| 3,231,635 | A | | 1/1966 | Holden et al. |
| 3,816,344 | A | * | 6/1974 | Shimizu et al. .............. 502/257 |
| 3,867,278 | A | * | 2/1975 | Olson ...................... 208/111.05 |
| 3,986,947 | A | * | 10/1976 | Wilson et al. ................ 208/138 |
| 4,102,819 | A | * | 7/1978 | Petrow et al. ................ 502/262 |
| 4,229,320 | A | * | 10/1980 | Slaugh ........................ 502/241 |
| 4,240,933 | A | * | 12/1980 | Copelin ...................... 502/174 |
| 4,247,726 | A | * | 1/1981 | Slaugh ........................ 502/241 |
| 4,338,221 | A | * | 7/1982 | Qualeatti ..................... 502/241 |
| 4,369,129 | A | * | 1/1983 | Mauldin et al. .............. 502/241 |
| 4,407,736 | A | * | 10/1983 | Pellet et al. .................. 502/230 |
| 4,642,302 | A | * | 2/1987 | Wood et al. .................. 502/332 |
| 4,713,363 | A | * | 12/1987 | Hucul .......................... 502/262 |
| 4,740,360 | A | | 4/1988 | Geus et al. |
| 4,845,173 | A | | 7/1989 | Yoshida et al. |
| 5,110,779 | A | | 5/1992 | Hucul |
| 5,242,984 | A | | 9/1993 | Dillman et al. |
| 5,254,518 | A | * | 10/1993 | Soled et al. .................. 502/241 |
| 5,767,038 | A | * | 6/1998 | Perego et al. ................ 502/235 |
| 6,083,867 | A | * | 7/2000 | Wu et al. ..................... 502/241 |
| 6,090,359 | A | | 7/2000 | Hucul |
| 6,376,622 | B1 | | 4/2002 | Hucul |
| 6,395,841 | B1 | | 5/2002 | Calverley et al. |
| 6,399,538 | B1 | * | 6/2002 | Hucul .......................... 502/325 |
| 6,455,656 | B2 | | 9/2002 | Hahnfeld et al. |
| 6,534,441 | B1 | * | 3/2003 | Bartley et al. ............... 502/337 |
| 6,992,039 | B2 | * | 1/2006 | Jiang et al. .................. 502/327 |
| 7,030,056 | B2 | * | 4/2006 | Birke et al. .................. 502/330 |
| 7,060,651 | B2 | * | 6/2006 | Barelko et al. .............. 502/240 |
| 7,425,647 | B2 | * | 9/2008 | Lemanski et al. .......... 560/241.1 |
| 7,452,844 | B2 | * | 11/2008 | Hu et al. ...................... 502/262 |
| 7,592,290 | B2 | * | 9/2009 | Hussain et al. .............. 502/262 |
| 7,811,964 | B2 | * | 10/2010 | Galperin et al. ............. 502/326 |
| 8,119,558 | B2 | * | 2/2012 | Wagner et al. ............... 502/241 |

(Continued)

FOREIGN PATENT DOCUMENTS

| EP | 1598110 A1 | 11/2005 |
| JP | 2004-269552 A | 9/2004 |

(Continued)

OTHER PUBLICATIONS

Applied Heterogeneous Catalysts, The Preparation of Catalysts, 1987, p. 75-123, Institute Francais Petrole Publications.

(Continued)

*Primary Examiner* — Cam N. Nguyen

(57) ABSTRACT

The present invention is an improved method for preparing a heterogeneous, supported hydrogenation catalyst that comprises a Group VIII A metal and a catalyst support (for example, $SiO_2$, with either a hydrophilic or a hydrophobic surface) via aqueous deposition precipitation as well as the catalyst prepared by said method.

6 Claims, No Drawings

(56) References Cited

U.S. PATENT DOCUMENTS

| | | |
|---|---|---|
| 8,263,812 B2 | 9/2012 | Meitzner |
| 2003/0105170 A1* | 6/2003 | Jothimurugesan et al. ... 518/715 |
| 2003/0181328 A1 | 9/2003 | Hwang et al. |
| 2006/0128565 A1 | 6/2006 | Flytzani-Stephanopoulos et al. |
| 2007/0183968 A1 | 8/2007 | Healey et al. |

FOREIGN PATENT DOCUMENTS

| | | |
|---|---|---|
| WO | 0059632 A1 | 10/2000 |
| WO | 01/74912 A1 | 10/2001 |
| WO | 0174912 A1 | 10/2001 |

OTHER PUBLICATIONS

Letellier et al; Catalysis Letters; 2006; p. 115-124; vol. 110.
Successful Design of Catalysts, 1989, p. 146-158, vol. 44.
PCT/US09/043304 Intl Preliminary Report on Patentability.
PCT/US09/043304 Intl Search Report.
PCT/US09/043304 Written Opinion.
Ness, Molecular Weight Effects in the Hydrogenation of Model Polystyrenes Using Platinum Supported on Wide-Pore Silica, Macromolecules 2002, 35, 602-609.
Kruk, Pore Size Tailoring in Large-Pore SBA-15 Silica Synthesized in the Presence of Hexane, Langmuir 2007, 23, 7247-7254.
Chytil, Topics in Catalyst, vol. 45, Nos. 1-4, Aug. 31, 2007, pp. 93-99.

* cited by examiner

METHOD FOR PREPARING A HETEROGENEOUS, HIGH-ACTIVITY PLATINUM-CONTAINING, SUPPORTED HYDROGENATION CATALYST

This application is a non-provisional application claiming priority from the U.S. Provisional Patent Application No. 61/055,254, filed on May 22, 2008, entitled "METHOD FOR PREPARING A HETEROGENEOUS, HIGH-ACTIVITY PLATINUM-CONTAINING, SUPPORTED HYDROGENATION CATALYST," the teachings of which are incorporated by reference herein, as if reproduced in full hereinbelow.

This invention relates generally to a method of preparing a catalyst, particularly a heterogeneous catalyst, used in hydrogenating a polymer, specifically a polymer that contains an aromatic ring. Illustrative polymers that contain an aromatic ring include a vinyl aromatic homopolymer (for example, polystyrene) and a styrenic block copolymer (SBC) such as a styrene-isoprene-styrene (SIS) triblock copolymer, a styrene-butadiene-styrene (SBS) triblock copolymer, a styrene-butadiene-styrene-butadiene-styrene (SBSBS) pentablock copolymer or a styrene-isoprene-styrene-isoprene-styrene (SISIS) pentablock copolymer. This method particularly includes use of aqueous deposition-precipitation technology rather than either of non-aqueous incipient wetness technology and aqueous incipient wetness technology. This method more particularly includes use of silica ($SiO_2$), either with a hydrophobic surface or a hydrophilic surface, as a catalyst support and, optionally, a deactivation resistant metal (for example, rhenium (Re)). This invention also relates to catalysts prepared by the method and use of such catalysts in hydrogenating an aromatic ring double bond of an aromatic ring-containing polymer.

U.S. Pat. No. 6,376,622 to Hucul discloses a heterogeneous, $SiO_2$-supported metal hydrogenation catalyst and a process for hydrogenating an aromatic polymer using the catalyst. The metal is selected from nickel, cobalt, rhodium, ruthenium, palladium, platinum or a combination thereof. The catalyst may also comprise a deactivation-resistant component or metal selected from rhenium, molybdenum, tungsten, tantalum, niobium or a mixture thereof. The $SiO_2$ has a certain pore size distribution such that at least (>) 95 percent (percent) of its pore volume is defined by pores having a diameter of from 30 nanometers (nm) (300 angstroms (Å)) to 100 nm (1,000 Å). The aromatic polymer may be a SBC.

U.S. Pat. Nos. 6,376,622, 6,090,359 (Hucul), and U.S. Pat. No. 6,395,841 (Calverly et al.) teach that promoters such as alkali metal, alkaline earth metal or lanthanide containing compounds may be used to aid in dispersing catalytic metal onto a $SiO_2$ support or in stabilizing such catalytic metal during reaction, but notes that use of such promoters is not preferred.

U.S. Pat. No. 6,455,656 (Hahnfeld et al.) provides similar teachings relative to use of such promoters, but does not suggest that use of promoters is not preferred.

U.S. Pat. No. 5,110,779 to Hucul discloses heterogeneous hydrogenation catalysts that may include promoters to further enhance catalyst selectivity in some reactions. Hucul teaches that the heterogeneous catalysts may be prepared by forming a dispersion or solution of a catalytic metal or a metal compound such as a metal salt in an appropriate solvent media, such as water or an alcohol, combining the solution or dispersion of metal with a support material and removing solvent media to obtain a composite of the support and metal or metal compound. Hucul includes as representative nonaqueous diluents lower alkanols having up to five carbon atoms (for example, methanol, ethanol or propanol).

U.S. Pat. No. 6,090,359 (Hucul) teaches that $SiO_2$-supported catalysts can be prepared as noted in U.S. Pat. No. 5,110,779 and adds that an appropriate metal or metal-containing compound can be deposited on a support by vapor phase deposition, aqueous impregnation or nonaqueous impregnation followed by calcination, sublimation or any other conventional method. Hucul refers to *Studies in Surface Science and Catalysis*, "Successful Design of Catalysts" V. 44, pages 146-158 (1989), and *Applied Heterogeneous Catalysts*, pages 75-123, Institute Français du Pétrole Publications (1987).

Hucul (U.S. Pat. No. 6,090,359) and Calverly et al. (U.S. Pat. No. 6,395,841) teach that in methods of impregnation, an appropriate metal-containing compound can be any compound containing a metal which will produce a usable hydrogenation catalyst. These compounds can be salts, coordination complexes, organometallic compounds or covalent complexes, but are preferably metal halide salts with metal chloride salts being most preferred. Typical metal contents range from 0.1 weight percent (wt percent) to 10 wt percent, based upon total $SiO_2$-supported catalyst weight.

U.S. Provisional Patent Publication 60/013,422, filed 13 Dec. 2007 (Olken et al.), discloses preparation of such heterogeneous hydrogenation catalysts, via a one-step, incipient wetness process, but with an aqueous solvent rather than a non-aqueous solvent.

As between heterogeneous catalysts prepared by non-aqueous incipient wetness and those prepared by aqueous incipient wetness, the latter catalysts appear to have a comparable activity to the former. "Activity" means a measured rate of polymer hydrogenation, in units of moles of aromatic rings per hour per gram of catalyst at a specified temperature, pressure and polymer concentration. This measurement is described in greater detail in examples presented below.

A desire exists for a heterogeneous hydrogenation catalyst that has a greater activity than that prepared by non-aqueous or aqueous incipient wetness, especially if that greater activity occurs in conjunction with at least one of a reduction in cost, a reduction in byproducts or a simplified process. A desire also exists for a heterogeneous hydrogenation catalyst that has improved efficiency relative to that of a catalyst prepared by non-aqueous or aqueous incipient wetness. "Efficiency" refers to activity per unit weight of hydrogenation metal. An improvement in efficiency may lead, in turn, to a reduction in catalyst cost, in that less hydrogenation metal is required for any given catalytic activity level.

In some aspects, this invention is a method for preparing a heterogeneous hydrogenation catalyst that comprises a Group VIII A metal and a catalyst support via aqueous deposition precipitation, the method comprising:

a. preparing a wetted catalyst support via aqueous deposition precipitation by precipitating a Group VIII A metal precursor from an aqueous solution of the Group VIII A metal precursor onto a catalyst support, the wetted catalyst support having the Group VIII A metal precursor deposited on, and dispersed across, catalyst support surfaces;

b. converting the wetted catalyst support to a dried catalyst support; and c. subjecting the dried catalyst support to a reducing atmosphere under conditions sufficient to convert the Group VIII A metal precursor to its metallic state; the reduced Group VIII A metal having a percent dispersion in excess of (>) 25 percent (for example, ≥35 percent) and the catalyst having a hydrogenation activity expressed as >0.1 moles of aromatic rings per hour per gram of catalyst, preferably ≥0.15 moles of aromatic rings per hour per gram of catalyst, and more preferably ≥0.18 moles of aromatic rings per hour per gram of catalyst.

The process optionally further comprises intermediate sequential steps b1. and b2. that succeed step b. and precedes step c., step b1. comprising wetting the dried catalyst support with an aqueous solution of a deactivation-resistant metal precursor to produce a homogenized, wetted catalyst support, and step b2. converting the homogenized, wetted catalyst support to a dried, impregnated catalyst support. The deactivation-resistant metal is preferably rhenium (Re).

Step a. above occurs at a temperature of ≥60 degrees centigrade (° C.). The temperature is desirably less than or equal to (≤) 100° C. In step a. the aqueous solution has a pH that is preferably within a range of from 8 to 12, more preferably from 10 to 12.

One may also add a precursor of a metal other than Re (for example, a precursor of a metal selected from lanthanum (La), barium (Ba), yttrium (Y), niobium (Nb), cerium (Ce), gadolinium (Gd) or a mixture thereof) to the aqueous solution of step a. The metal is preferably La In some aspects, this invention is a heterogeneous hydrogenation catalyst, the catalyst comprising a Group VIII A metal and a catalyst support, the catalyst having a Group VIII A metal dispersion percentage of >25 percent, and a carbon monoxide (CO) adsorption ≥0.4 standard cubic centimeters CO per gram (g) of catalyst (scc CO/g-catalyst), preferably ≥0.5 scc CO/g-catalyst, more preferably ≥0.6 scc CO/g-catalyst and still more preferably ≥0.7 scc CO/g-catalyst. As long as one attains a Group VIII A metal dispersion percentage of >25 percent, one need not choose any particular Group VIII A metal content or Group VIII A metal content range. Solely from a cost of catalytic metal point of view, less catalytic metal is better than more catalytic metal as long as the catalyst effectively hydrogenates a polymer to a desired level of hydrogenation within a reasonable period of time. Satisfactory results follow with a Group VIII A metal content of ≤5 wt percent, based upon total heterogeneous hydrogenation catalyst weight. The Group VIII A metal content is preferably ≤3.5 wt percent, more preferably ≤2.5 wt percent, and still more preferably ≤2 wt percent, each wt percent being based upon total heterogeneous hydrogenation catalyst weight.

When ranges are stated herein (for example, a range of from 2 to 10), both end points of the range (for example, 2 and 10) and each numerical value, whether such value is a rational number or an irrational number, is included within the range unless otherwise specifically excluded.

References to the Periodic Table of the Elements herein refer to the Periodic Table of the Elements, published and copyrighted by CRC Press, Inc., 2003. Any references to a Group or Groups shall be to the Group or Groups reflected in this Periodic Table of the Elements using the IUPAC system for numbering groups.

Unless stated to the contrary, implicit from the context, or customary in the art, all parts and percents are based on weight. For purposes of United States patent practice, the contents of any patent, patent application, or publication referenced herein are incorporated by reference in their entirety (or the equivalent US version thereof is so incorporated by reference) especially with respect to the disclosure of synthetic techniques, definitions (to the extent not inconsistent with any definitions provided herein) and general knowledge in the art.

"Comprising" and its derivatives does not exclude the presence of any additional component, step or procedure, whether or not the same is disclosed herein. All compositions claimed herein through use of "comprising" may include any additional additive, adjuvant, or compound whether polymeric or otherwise, unless stated to the contrary. In contrast, "consisting essentially of" excludes from the scope of any succeeding recitation any other component, step or procedure, excepting those that are not essential to operability. "Consisting of" excludes any component, step or procedure not specifically delineated or listed. Unless stated otherwise, "or" refers to the listed members individually as well as in any combination.

Expressions of temperature may be in terms either of degrees Fahrenheit (° F.) together with its equivalent in ° C. or, more typically, simply in ° C.

The catalyst support preferably comprises $SiO_2$, more preferably $SiO_2$ with a certain pore size distribution and a certain surface area. Use American Society for Testing and Materials (ASTM) D-4284-83 to determine pore size distribution, determined via mercury porosimetry and ASTM D-4641-87 to determine surface area.

The catalyst support contains a plurality of pores. The pores preferably have a size or diameter that is sufficient to accommodate entry therein of a substrate polymer molecule (for example, polystyrene) when the polymer molecule(s) is/are in solution, the aromatic rings of which one desires to hydrogenate. The pore diameter is preferably ≥two times, more preferably ≥three times that of the substrate polymer molecule. The catalyst support preferably has very few, most preferably no, pores that bar entry of the substrate polymer molecule, but accommodate entry of Group VIIIA metals.

If the substrate polymer molecule is polystyrene, Ness et al., Macromolecules, volume 35, pages 602-609 (2002), suggests than one can estimate radius of gyration (Rg) in nm for polystyrene molecules in a good solvent using the following equation:

$$Rg = 1.2E^{-2} * Mn^{0.595}$$

In this equation the radius of gyration has units of nm while number average molecular weight (Mn) is in units of Daltons or grams per mole (g/mol). Ness et al. consider cyclohexane to be a good solvent at elevated temperatures such as 170° C. The above equation also appears to provide a reasonable estimate for Rg of styrenic copolymers.

The pore size distribution is preferably from 300 Å to 10,000 Å (30 nm to 1,000 nm), more preferably from 300 Å to 3500 Å (30 nm to 350 nm), still more preferably from 350 Å to 1000 Å (35 nm to 100 nm), and even more preferably from 500 Å to 600 Å (50 nm to 60 nm). For each pore size distribution range, particularly preferred results follow when one minimizes, preferably substantially minimizes and, even more preferably, substantially eliminates pore sizes below each stated lower limit (for example, 300 Å (30 nm)). The aforementioned pore size distributions, especially those up to and including 1,000 Å (100 nm), are particularly suitable for polymers having a Mn≤100,000. Higher molecular weight polymers (Mn>100,000) favor pore size distributions >1,000 Å (100 nm).

An estimated upper limit for an apparent pore diameter (APD) relates to surface area (SA) ($m^2/g$) by way of a formula where APD (in Å)=$4 \times 10^4$ (PV/SA) and PV means pore volume in (cubic centimeters per gram ($cm^3/g$). With a PV of 1 $cm^3/g$ as an example, an APD of 300 Å (30 nm) yields a SA of 140 $m^2/g$, an APD of 500 Å (50 nm) yields a SA of 80 $m^2/g$ and an APD of 1000 Å (100 nm) yields a SA of 40 $m^2/g$. Skilled artisans can readily calculate SA for any APD within the above noted pore size distributions. Skilled artisans recognize that one may have a higher PV (for example, 1.2) as long as the PV is not so large that a corresponding catalyst support material (for example, $SiO_2$) lacks sufficient structural integrity (that is, it is too fragile) to function as a viable catalyst support. Skilled artisans also recognize that an actual measured APD may be, and often is, somewhat smaller than the above formula predicts.

Fully hydrophilic $SiO_2$ and fully hydrophobic $SiO_2$ represent opposite ends of a range of surface hydroxyl group content. Fully hydrophilic $SiO_2$ has what amounts to full surface saturation of hydroxyl groups at a hydroxyl group concentration of from four to five hydroxyl groups per square nanometer ($OH/nm^2$). Fully hydrophobic $SiO_2$ has a significantly reduced level of surface hydroxyl groups such as 0.5 $OH/nm^2$. As one progresses from one end of the range, nominally that of the fully hydrophilic $SiO_2$, to the other end of the range, nominally that of the fully hydrophobic $SiO_2$, $SiO_2$ become less hydrophilic and eventually reach a point where, as between hydrophilic and hydrophobic, the $SiO_2$ is more hydrophobic than hydrophilic. For purposes of this invention, either hydrophilic or hydrophobic $SiO_2$ may be used.

One technique to measure weight loss due to loss of hydroxyl groups involves use of a thermal gravimetric analyzer (TGA) to heat a sample of hydrophilic $SiO_2$ from room temperature (nominally 25° C.) to 800° C. at a rate of 10° C. per minute under a flow of nitrogen gas. Weight loss from room temperature to 200° C. appears to be due to loss of adsorbed water. Weight loss between 200° C. and 800° C. appears to be due to loss of hydroxyl groups. Even at 800° C., some hydroxyl groups remain as it is very difficult, if not impossible, to reduce surface hydroxyl group content to zero $OH/nm^2$ without concurrently destroying porosity of the $SiO_2$. TGA effectively measures content of thermally unstable hydroxyl groups. By way of illustration, in the "Examples" section below, Silica A has a surface hydroxyl group content of 4.8 $OH/nm^2$ and Silica B has a surface hydroxyl group content of 1.5 $OH/nm^2$. Ralph K. Iler, in *Chemistry of Silica*, Chapter 6, John Wiley, New York (1979) provides a wealth of information related to $SiO_2$.

The heterogeneous hydrogenation catalysts prepared as described herein include a Group VIIIA metal. Group VIIIA metals include nickel, cobalt, rhodium, ruthenium, palladium, platinum, or combinations thereof. For purposes of the present invention, platinum (Pt) provides preferred hydrogenation results, either alone or in combination with a promoter metal (for example, lanthanum (La) or niobium (Nb). If desired, one may add a deactivation resistant metal (for example, rhenium (Re)) subsequent to deposition of the Group VIII A metal (especially Pt) on the catalyst support.

Suitable catalyst supports include the various commercially available $SiO_2$ described below under a heading labeled "Examples".

Incorporation of the Group VIIIA metal, especially platinum, into the supported catalysts preferably occurs by way of a catalytic precursor material, preferably an acid or an acid salt. For Pt, the precursor material is preferably a water-soluble Pt salt, more preferably a water-soluble Pt salt selected from a group consisting of chloroplatinic acid (CPA), platinum tetramine nitrate (PAN), hydrogen hexahydroxyplatinate (HHP), and ammonium tetrachloroplatinate (ATP). For palladium (Pd), the precursor material is also a water-soluble salt, preferably ammonium tetrachloropalladate (ATPd).

The Group VIII A metal precursor level is preferably present in an amount sufficient to provide a reduced Group VIII A metal level ≤5 wt percent, based upon total heterogeneous hydrogenation catalyst weight, with a dispersion percentage ≥25 percent. The Group VIII A metal level is more preferably ≤3.5 wt percent, still more preferably ≤2.5 wt percent, and even more preferably ≤2 wt percent, with levels as low as 0.55 wt percent providing very satisfactory results, each wt percent being based upon total heterogeneous hydrogenation catalyst weight.

Illustrative preferred Group VIII A metal levels include 0.58 wt percent, 0.78 wt percent, 0.84 wt percent, 0.89 wt percent, 0.9 wt percent, 0.92 wt percent, 0.93 wt percent, 1 wt percent, 1.3 wt percent, 1.33 wt percent, 1.36 wt percent, 1.6 wt percent, 1.74 wt percent, 1.8 wt percent, 1.9 wt percent, and 2 wt percent, each of which is used in the Examples section below. The dispersion percentage may be any percentage that leads to the above Group VIII A metal levels. As such, it may theoretically be as high as 100 percent, but lower dispersion percentages such as 40 percent to ≤75 percent are more common and provide very acceptable results, especially at relatively low Group VIII A metal levels.

U.S. Pat. No. 6,376,622 teaches that suitable deactivation-resistant metals include rhenium, molybdenum, tungsten, tantalum, niobium or mixtures thereof. When one uses a deactivation resistant metal, and such use is optional for purposes of the present invention, rhenium represents a preferred deactivation resistant metal. Perrhenic acid, aqueous perrhenic acid solutions and ammonium perrhenate constitute preferred deactivation resistant metal precursors. Rhenium, when used, must be added via a separate procedure, preferably subsequent to deposition-precipitation of the Group VIIIA metal, especially platinum. Addition of rhenium suitably occurs by way of incipient wetness.

The deactivation resistant metal or component, when used, is preferably present in an amount sufficient to significantly inhibit deactivation of the Group VIIIA metal component following exposure of the catalyst to polar impurities within a polymer composition, herein referred to as a deactivation inhibiting amount. Deactivation of the Group VIIIA metal is evidenced by a significant decrease in hydrogenation reaction rate. This is exemplified in comparisons of a mixed hydrogenation catalyst and a catalyst containing only a Group VIIIA metal component under identical conditions in the presence of a polar impurity, wherein the catalyst containing only a Group VIIIA metal component exhibits a hydrogenation reaction rate which is less than 75 percent of the rate achieved with the mixed hydrogenation catalyst.

EXAMPLES

The following examples illustrate, but do not limit, the present invention. All temperatures are in ° C. Arabic numerals designate Examples (Ex) of the present invention and capital alphabetic letters indicate Comparative Examples (Comp Ex or CEx).

Ex 1

Preparation Using Hydrophilic $SiO_2$

Place 9.9 grams (g) of $SiO_2$ (hereinafter "Silica A") that has a hydrophilic surface (CARIACT™ Q-50 $SiO_2$, pore size range of 500 Å (50 nm) to 600 Å (60 nm), a measured APD of 490 Å (49 nm) (versus a calculated APD of 620 (62 nm), PV of 1.2 $cm^3/g$, median particle size of 67 μm, SA of 78 $m^2/g$, Fuji Silysia) placed in a 250 milliliter (ml) round bottom flask with 100 ml of 0.5 molar (M) ammonium hydroxide solution and stir contents of the flask using an overhead stirrer to form a slurry. Add 0.245 g of a chloroplatinic acid (CPA) salt dissolved in 10 ml of water to the slurry. The slurry has a pH of 10.8. Fit the flask with a reflux condenser, then the heat the mixture, with continued stirring, to a set point temperature of 90° C. Maintain stirring at the set point temperature for and then cool the flask contents to room temperature. The flask contents have a pH of 10.2.

Use vacuum filtration and a Buchner funnel to separate solid components of the slurry from liquid components of the slurry. Wash the solid components three times with 100 ml aliquots of deionized (DI) water. Dry the washed solids in a forced air convection oven operating at a set point temperature of 100° C. The washed and dried solids contain less than about 0.05 wt percent chlorine and less than 3 wt percent water, each wt percent being based upon total weight of the washed and dried solids.

Place 2.75 g of the dried, washed solids on top of a sintered quartz frit in a one inch (2.54 centimeter (cm)) outside diameter (O.D.) quartz tube, and then place the tube and its contents in a vertical tube furnace. Pass nitrogen downward through the dried, impregnated $SiO_2$ for 30 minutes. Convert the dried, impregnated $SiO_2$ to a reduced, activated catalyst by first replacing the nitrogen with a modified nitrogen stream that has a hydrogen content of five percent by volume (vol percent) while concurrently heating the furnace and its contents to a set point temperature of 200° C. over a period of two hours. Continue heating the furnace and its contents at a set point temperature of 200° C. for an additional two hours, before cooling to room temperature. Replace the modified nitrogen stream with pure nitrogen and pass the pure nitrogen through the activated catalyst for 30 minutes before removing the activated catalyst from the quartz tube and placing it in a bottle and sealing the bottle.

The activated catalyst has a calculated composition of 1.0 wt percent Pt on a $SiO_2$ support assuming all of the Pt is deposited. Neutron activation analysis (NAA) reveals that the percent Pt is 0.91 percent. This material exhibits a carbon monoxide adsorption of 0.72 cc CO/g-catalyst which gives a metal dispersion of 69.1 percent.

Place 0.89 g of the activated catalyst in a one liter (1 L) stirred reactor (Pressure Products Industries) together with 400 g of a solution of 13.7 wt percent of polystyrene (number average molecular weight or $M_n$ of 50,000, 54.8 grams (g) or 0.527 moles of aromatic rings) in cyclohexane solvent, based upon combined weight of polystyrene and cyclohexane. Purge reactor headspace first with nitrogen, then with hydrogen to eliminate air and moisture from the reactor. Heat reactor contents to a set point temperature of 160° C. while adding hydrogen in an amount sufficient to establish a reactor pressure of 600 pounds per square inch gauge (psig) (4137 kilopascals (KPa)). Continue heating and hydrogen addition until reactor pressure remains at 600 psig (4137 KPa) with substantially no addition of hydrogen. Return the reactor contents to ambient temperature and pressure (atmospheric (14.7 psig or 101 KPa), then recover reactor contents.

Determine conversion or extent of hydrogenation of polystyrene aromatic rings by comparing an absorbance band, determined via Ultraviolet-Visible (UV-Vis) Spectroscopy using a UV-Vis Spectrometer (LAMBDA™ EZ210, Perkin Elmer), of a peak near 260 nanometers (nm) of the reactor contents with that of an unhydrogenated polystyrene solution (for example, the polystyrene solution before hydrogenation). The conversion is 100 percent, based upon aromatic ring content prior to hydrogenation.

As a means of comparing catalyst performance, determine hydrogenation rate at a point in time when 50 percent of aromatic rings present in the polystyrene solution are hydrogenated. Hydrogen consumption for a solution with 0.527 moles of polystyrene is 1.58 moles or 3.19 g. This means that polystyrene aromatic ring hydrogenation reaches a level of 50 percent when hydrogen consumption aggregates to 1.59 g. Calculate rate of hydrogenation at this point in units of moles of aromatic rings hydrogenated per hour per gram of catalyst (moles/hr/g of catalyst). The calculated rate is 0.458 moles of aromatic rings per hour per gram of catalyst.

Ex 2 Through Ex 45

Replicate Ex 1 with changes as shown in Table I below. Silica B is a hydrophobic $SiO_2$ that has a surface area (SA of 58 $m^2/g$, an average pore diameter (APD of 759 angstroms (Å) (76 nanometers (nm)), a pore volume (PV) of 1.1 $cm^3/g$, a median particle size of 70 μm and a surface hydroxyl concentration of 1.5 $OH/nm^2$, based upon weight loss determination upon heating to 800° C. "Silica C", a variation of Silica A, is commercially available from Fuji Silysia as CARIACT™ Q-50C (a measured APD of 350 Å (versus a calculated APD of 550 Å), PV of 0.83 $cm^3/g$, median particle size of 60 μm, SA of 62 $m^2/g$). "Silica D", another variation of Silica A, is commercially available from Fuji Silysia as CARIACT™ Q-60C (a measured APD of 400 Å (versus a calculated APD of 800 Å), PV of 0.83 $cm^3/g$, median particle size of 60 μm, SA of 47 $m^2/g$). "Silica E", yet another variation of Silica A, is commercially available from Fuji Silysia as CARIACT™ Q-50C SP (a measured APD of 350 Å (versus a calculated APD of 900 Å), PV of 0.92 $cm^3/g$, median particle size of 30 μm, SA of 47 $m^2/g$). "Silica F" is a further variation of Silica A provided by Fuji Silysia as CARIACT™ Q-50 and calcined in air to 600° C. to render this hydrophilic $SiO_2$ hydrophobic by removal of surface hydroxyl groups (a measured APD of 490 Å (versus a calculated APD of 600 Å), PV of 1.2 $cm^3/g$, median particle size of 60 μm, SA of 78 $m^2/g$). For most catalysts, use neutron activation analysis to verify the metal loading obtained. However, a number of samples are identified with an asterisk in conjunction with a nominal or target metal loading rather than a measured value. Measured metal loadings are, as a general rule, typically somewhat lower than the target metal loadings. On that basis, a Pt dispersion estimate for samples that lack neutron activation analysis is likely to be lower than a true dispersion based upon a metal loading equal to the nominal or target metal loading.

The data in Table I demonstrate that good catalysts can be made by this method with a variety of platinum salts using a variety of bases to effect the precipitation onto a variety of $SiO_2$ support materials. In a few cases, catalyst activity is lower than expected (for example, Ex 2 versus Ex 8) for reasons that are not readily apparent. Possible sources of lower than expected catalyst activity include lower than desired level of pH or temperature control during the deposition-precipitation reaction, and problems with catalyst reduction (for example, a temperature that is either too high or too low relative to a temperature that facilitates optimum reduction, or sample contamination by, for example, an alkali metal or a nitrogen (N-), sulfur (S-), or phosphorous (P)-containing species, any of which acts as a poison for the hydrogenation catalyst. Nonetheless, the preparation method generally produces catalysts with high metal dispersions and good hydrogenation activity. An experiment, CEx F, in which tetrachloropalladate is precipitated using sodium hydroxide gives a Pd catalyst with no measurable activity. While data show good dispersion of Pd, there is no hydrogenation activity under conditions shown in Table I. A change of one or more of catalyst preparation parameters, composition and operating conditions may produce some detectable level of hydrogenation with Pd as the Group VIII metal.

Ex 46 through Ex 54 and CEx A

Replicate Ex 1 with changes as shown in Table II below which includes addition of rhenium (Re), typically as perrhenic acid ($HReO_4$) in conjunction with Pt addition. In these examples, Re does not appear to precipitate, but rather stays in solution. Thus, while good catalysts result from this process, there is no real advantage to including Re in an initial deposition precipitation step as it is not incorporated into a resulting catalyst to any significant degree.

An examination of the catalysts used in Table II reveals no Re. From this, one may conclude that Re remains in solution. The presence of Re in solution appears to act as a pH buffer that lessens effectiveness of the added base and thus lowers the quantity of Pt precipitated on the carrier.

The data in Table II demonstrate that there is no advantage in adding Re at the same time as Pt. The catalysts of Table II do, however, function satisfactorily in hydrogenation.

Ex 55 through Ex 62

Replicate Ex 1 with changes as shown in Table III below. Changes include type of $SiO_2$ support, amount of Group VIII A metal, in this case Pt, and adding lanthanum nitrate hydrate in water as a lanthanum precursor and inclusion of niobium (Nb) concurrent with addition of the Group VIII A metal precursor (CPA). Ex 60 and Ex 62 show a nominal percent Pt as there is no elemental analysis for Ex 60 and Ex 62.

The data in Table III demonstrate no advantage to incorporation of either of La or Nb via deposition-precipitation.

CEx B through CEx K

Replicate Ex 1 with changes as shown in Table IV below to provide for Pt precipitation via urea addition. In some of the materials made with urea, the pH finishes near neutral rather than basic and so it is likely that minimal Pt precipitation occurs. Also, poor catalysts generally result when very low urea concentrations are used. While active catalysts can be made by the deposition precipitation method with urea as the base, this approach has no advantages compared to common inorganic bases such as ammonium hydroxide and sodium hydroxide.

The data in Table IV demonstrate a situation where pH starts off low and increases upon heating under conditions where urea decomposes, thereby releasing ammonia homogeneously in to the solution. Pt precipitation appears to be optimal when urea concentration is 1M versus lower values of 0.1M. Cationic Pt salts (for example, PAN) appear to promote Pt deposition more effectively than anionic precursors such as CPA. Use of urea does not appear to be preferred relative to ammonium hydroxide because a delayed pH change does not add any substantive benefit when one uses a Pt complex (for example, CPA, PAN, and ATP) that is slow to react with base at room temperature and requires heating to elevated temperatures (for example, 60° C. to 90° C.) to effectively precipitate Pt onto a $SiO_2$ substrate.

TABLE I

| Ex/CEx | % Pt | $SiO_2$ | Pt Salt | CO Ads | % Disp | Hydrogenation Activity | % Hyrogenation Via UV | Soln/Solid | Base | Conc Moles (M) | Temperature (° C.) | Time (hours) | pH Final |
|---|---|---|---|---|---|---|---|---|---|---|---|---|---|
| 2 | nd*/1.0 | A | CPA | 0.78 | 68.1 | 0.514 | 99.0 | 10 | $NH_4OH$ | 0.5 | 90 | 4 | 10.2 |
| 3 | nd*/1.0 | A | CPA | 0.78 | 68.1 | 0.522 | 99.9 | 10 | $NH_4OH$ | 0.5 | 90 | 4 | 10.2 |
| 4 | 2.5 | A | CPA | 1.69 | 58.9 | 1.070 | 99.9 | 10 | $NH_4OH$ | 0.5 | 90 | 4 | 9.7 |
| 5 | 2.5 | A | CPA | 1.69 | 58.9 | 1.052 | 99.9 | 10 | $NH_4OH$ | 0.5 | 90 | 4 | 9.7 |
| 6 | 0.9 | C | CPA | 0.68 | 65.9 | 0.201 | 99.9 | 10 | $NH_4OH$ | 0.5 | 90 | 4 | 10.4 |
| 7 | 1.8 | A | CPA | 1.17 | 56.5 | 0.235 | 99.8 | 10 | $NH_4OH$ | 0.5 | 90 | 4 | 9.6 |
| 8 | 1.6 | E | CPA | 0.97 | 52.6 | 0.570 | 99.9 | 10 | $NH_4OH$ | 0.5 | 90 | 4 | 9.6 |
| 9 | 1.3 | D | CPA | 0.73 | 49.1 | 0.303 | 99.9 | 10 | $NH_4OH$ | 0.5 | 90 | 4 | 8.7 |
| 10 | 0.92 | A | CPA | 0.71 | 62.2 | 0.409 | 99.9 | 10 | $NH_4OH$ | 0.5 | 90 | 4 | 10.2 |
| 11 | 0.88 | C | CPA | 0.63 | 62.2 | 0.217 | 99.9 | 10 | $NH_4OH$ | 0.5 | 90 | 4 | 10.4 |
| 12 | 0.91 | A | CPA | 0.58 | 55.6 | 0.338 | 99.3 | 10 | $NH_4OH$ | 0.5 | 90 | 1 | 9.9 |
| 13 | 0.82 | A | CPA | 0.50 | 65.1 | 0.269 | 99.4 | 10 | $NH_4OH$ | 0.5 | 90 | 0.2 | 9.9 |
| 14 | 0.81 | A | CPA | 0.52 | 69.4 | 0.272 | 99.3 | 3.5 | $NH_4OH$ | 0.5 | 90 | 1.5 | 9.3 |
| 15 | 0.96 | A | CPA | 0.69 | 62.8 | 0.280 | 98.7 | 5 | $NH_4OH$ | 1 | 90 | 2 | 10.5 |
| 16 | 1.74 | A | CPA | 1.21 | 60.5 | 0.731 | 99.8 | 5 | $NH_4OH$ | 1 | 90 | 2 | 10.1 |
| 17 | 0.78 | A | CPA | 0.41 | 45.3 | 0.226 | 99.3 | 10 | $NH_4OH$ | 0.5 | 60 | 2 | 10.3 |
| 18 | 0.90 | A | ATP | 0.71 | 68.7 | 0.274 | 99.7 | 10 | $NH_4OH$ | 0.5 | 60 | 2 | 10.4 |
| 19 | 0.92 | A | ATP | 0.71 | 67.3 | 0.295 | 99.5 | 10 | $NH_4OH$ | 0.5 | 90 | 2 | 10.3 |
| 20 | 0.94 | A | CPA | 0.67 | 61.8 | 0.245 | 99.3 | 10 | $NH_4OH$ | 0.5 | 90 | 2 | 8.8 |
| 21 | 0.84 | C | CPA | 0.93 | 96.0 | 0.225 | 98.4 | 10 | $NH_4OH$ | 0.5 | 90 | 2 | 8.8 |
| 22 | 0.90 | D | CPA | 0.61 | 59.2 | 0.200 | 98.2 | 10 | $NH_4OH$ | 0.5 | 90 | 2 | 9.1 |
| 23 | 0.94 | E | CPA | 0.61 | 56.4 | 0.236 | 98.7 | 10 | $NH_4OH$ | 0.5 | 90 | 2 | 10.2 |
| 24 | 1.33 | D | CPA | 0.91 | 59.4 | 0.281 | 99.7 | 10 | $NH_4OH$ | 0.5 | 90 | 2 | 9.2 |
| 25 | 1.36 | E | CPA | 0.64 | 41.2 | 0.408 | 99.5 | 10 | $NH_4OH$ | 0.5 | 90 | 2 | 9.3 |
| 26 | 1.60 | A | CPA | 1.10 | 60.9 | 0.610 | 99.5 | 10 | $NH_4OH$ | 0.5 | 90 | 2 | 9.0 |
| 27 | 1.42 | C | CPA | 0.94 | 57.9 | 0.252 | 98.6 | 10 | $NH_4OH$ | 0.5 | 90 | 2 | 8.8 |
| 28 | 0.93 | F | CPA | 0.63 | 58.5 | 0.273 | 97.8 | 10 | $NH_4OH$ | 0.5 | 90 | 2 | 9.9 |
| 29 | 1.81 | F | CPA | 1.24 | 59.9 | 0.824 | 99.8 | 10 | $NH_4OH$ | 0.5 | 90 | 2 | 9.8 |
| 30 | 0.99 | A | PAN | 0.77 | 67.4 | 0.273 | 99.7 | 10 | $NH_4OH$ | 0.5 | 90 | 2 | 10.3 |
| 31 | 1.90 | A | CPA | 1.37 | 62.7 | 0.785 | 99.9 | 10 | $NH_4OH$ | 0.5 | 90 | 2 | 8.9 |
| 32 | 2.00 | A | CPA | 1.21 | 52.9 | 0.559 | 99.6 | 5 | $NH_4OH$ | 1 | 90 | 2 | 10.1 |
| 33 | 0.58 | A | CPA | 0.47 | 70.0 | 0.103 | 82.2 | 50 | $NH_4OH$ | 0.5 | 90 | 2 | 9.6 |
| 34 | *nd/3.5 | A | ATP | 0.73 | 18.1 | 0.726 | 99.2 | 10 | $NH_4OH$ | 0.5 | 60 | 2 | 10.5 |
| 35 | *nd/2 | A | CPA | 1.17 | 50.7 | 0.699 | 99.7 | 10 | $NH_4OH$ | 1 | 90 | 2 | 10.1 |
| 36 | *nd/2 | A | CPA | 1.17 | 50.7 | 0.699 | 99.7 | 10 | $NH_4OH$ | 1 | 90 | 2 | 9.6 |
| 37 | *nd/2 | A | CPA | 1.03 | 44.8 | 0.485 | *nd | 10 | $NH_4OH$ | 1 | 90 | 2 | 9.2 |
| 38 | *nd/1 | A | CPA | 0.69 | 59.2 | *nd | *nd | 10 | $NH_4OH$ | 1 | 90 | 2 | 9.8 |
| 39 | *nd/3.5 | B | ATP | 0.48 | 12.0 | 0.384 | 99.8 | 50 | NaOH | 0.1 | 60 | 2 | 6.0 |
| 40 | *nd/3.5 | B | ATP | 0.64 | 16.0 | 0.662 | 96 | 50 | NaOH | 0.1 | 60 | 2 | 6.0 |
| 41 | *nd/3.5 | B | ATP | 1.09 | 27.0 | 0.566 | 97.2 | 10 | $NH_4OH$ | 0.1 | 60 | 2 | *nd |
| 42 | *nd/3.5 | B | ATP | 1.00 | 25.0 | 0.662 | 99.3 | 10 | $NH_4OH$ | 0.1 | 60 | 2 | *nd |
| 43 | 0.90 | B | CPA | 1.14 | 99.5 | 0.226 | 98.8 | 10 | $NH_4OH$ | 0.5 | 90 | 4 | 10.3 |
| 44 | 1.44 | B | CPA | 0.95 | 57.2 | 0.436 | 99.1 | 10 | $NH_4OH$ | 0.5 | 90 | 2 | 9.3 |
| 45 | *nd/2 | B | CPA | 0.77 | 33.3 | *nd | *nd | 10 | $NH_4OH$ | 1 | 90 | 2 | 8.1 |

*nd = not determined;
*nd followed by numbers = nominal maximum value, not confirmed with neutron activation analysis

TABLE II

| Ex/CEx | % Pt | $SiO_2$ | Salt | CO Ads | % Disp | Hydrogenation Activity | % Hyrogenation Via UV | Soln/Solid | Base | Conc Moles (M) | Temperature (° C.) | Time (hours) | pH Final |
|---|---|---|---|---|---|---|---|---|---|---|---|---|---|
| 46 | nd*/3.5 | C | CPA | 1.30 | 32.3 | 0.285 | 99.9 | 10 | $NH_4OH$ | 0.5 | 90 | 4 | 9.8 |
| A | *nd/1.0 | A | ATPd | 0.93 | 44.0 | 0.00 | 0.00 | 10 | NaOH | drops | 90 | 2 | 9.5 |

TABLE II-continued

| Ex/CEx | % Pt | SiO$_2$ | Salt | CO Ads | % Disp | Hydrogenation Activity | % Hyrogenation Via UV | Soln/Solid | Base | Conc Moles (M) | Temperature (°C.) | Time (hours) | pH Final |
|---|---|---|---|---|---|---|---|---|---|---|---|---|---|
| 47 | *nd/3.5 | C | CPA | 0.82 | 20.3 | 0.294 | 99.7 | 10 | NH$_4$OH | 1 | 90 | 4 | 8.7 |
| 48 | 2.3 | A | CPA | 1.49 | 56.3 | 0.532 | 99.9 | 10 | NH$_4$OH | 0.5 | 90 | 4 | 8.7 |
| 49 | 2.3 | A | CPA | nd* | nd* | 0.662 | 99.6 | 10 | NH$_4$OH | 0.5 | 90 | 4 | 8.7 |
| 50 | *nd/1.0 | A | CPA | 0.77 | 66.8 | 0.405 | 99.9 | 10 | NH$_4$OH | 0.5 | 90 | 4 | 10.0 |
| 51 | *nd/1.0 | A | CPA | 0.69 | 59.7 | 0.548 | 99.4 | 10 | NH$_4$OH | 0.5 | 90 | 4 | 10.0 |
| 52 | *nd/3.5 | A | CPA | 1.84 | 45.7 | 0.777 | 99.2 | 10 | NH$_4$OH | 0.5 | 90 | 4 | 10.1 |
| 53 | *nd/3.5 | A | CPA | 1.66 | 41.4 | 0.712 | 98.8 | 10 | NH$_4$OH | 0.5 | 90 | 4 | 9.7 |
| 54 | 1.9 | A | CPA | 1.35 | 61.7 | 0.746 | 99.7 | 10 | NH$_4$OH | 0.5 | 90 | 4 | 9.3 |

*nd = not determined;
*nd followed by numbers = nominal maximum value, not confirmed with neutron activation analysis

TABLE III

| Ex/CEx | % Pt | SiO$_2$ | Salt | CO Ads | % Disp | Hydrogenation Activity | % Hyrogenation Via UV | Soln/Solid | Base | Conc Moles (M) | Temperature (°C.) | Time (hours) | Final pH |
|---|---|---|---|---|---|---|---|---|---|---|---|---|---|
| 55 | 0.9 | C | CPA | 0.79 | 68.4 | 0.060 | 85.7 | 10 | NH$_4$OH | 0.5 | 90 | 4 | 10.3 |
| 56 | 0.89 | B | CPA | 0.70 | 60.9 | 0.076 | 65.7 | 10 | NH$_4$OH | 0.5 | 90 | 4 | 10.2 |
| 57 | 0.9 | A | CPA | 0.73 | 70.3 | 0.270 | 98.5 | 10 | NH$_4$OH | 0.5 | 90 | 4 | 10.0 |
| 58 | 2.5 | A | CPA | 1.80 | 63.8 | 0.449 | 99.5 | 10 | NH$_4$OH | 0.5 | 90 | 4 | 9.7 |
| 59 | 2.0 | A | CPA | 1.43 | 62.1 | 0.400 | 99.5 | 10 | NH$_4$OH | 0.5 | 90 | 4 | 9.3 |
| 60 | *nd/1.0 | A | CPA | 0.68 | 59.6 | 0.121 | 99.7 | 10 | NH$_4$OH | 0.5 | 90 | 4 | 9.6 |
| 61 | 0.9 | A | CPA | 0.71 | 68.2 | 0.231 | 97.6 | 10 | NH$_4$OH | 0.5 | 90 | 4 | 10.3 |
| 62 | *nd/1.0 | A | CPA | 0.52 | 45.0 | 0.174 | 93.6 | 50 | NaOH | drops | 60 | 2 | 6.0 |

*nd = not determined;
*nd followed by numbers = nominal maximum value, not confirmed with neutron activation analysis

TABLE IV

| Ex/CEx | % Pt | SiO$_2$ | Salt | CO Ads | % Disp | Hydrogenation Activity | % Hyrogenation Via UV | Soln/Solid | Base | Conc Moles (M) | Temperature (°C.) | Time (hours) | Final pH |
|---|---|---|---|---|---|---|---|---|---|---|---|---|---|
| B | *nd/3.5/0 | A | PAN | 0.61 | 16.3 | 0.435 | 99.8 | 10 | Urea | 1 | 90 | 4 | 8.4 |
| C | *nd/3.5/0 | C | PAN | 0.53 | 13.2 | 0.290 | 99.84 | 10 | Urea | 1 | 90 | 4 | 8.7 |
| D | *nd/3.5/0 | A | CPA | 0.20 | 5.0 | 0.00 | 0 | 10 | Urea | 1 | 90 | 4 | 6.8 |
| E | *nd/3.5/0 | C | CPA | 0.15 | 3.8 | 0.00 | 7 | 10 | Urea | 1 | 90 | 4 | 6.6 |
| F | *nd/3.6/0 | B | ATP | 0.00 | 0.0 | 0.000 | 0 | 10 | Urea | 0.1 | 90 | 2 | *nd |
| G | *nd/3.5/0 | B | ATP | 0.46 | 11.4 | 0.225 | 90.6 | 10 | Urea | 1 | 90 | 4 | 7.8 |
| H | *nd/3.5/0 | B | ATP | 0.52 | 14.4 | 0.333 | 95.6 | 10 | Urea | 1 | 90 | 4 | 8.1 |
| I | *nd/3.5/0 | B | PAN | 0.20 | 5.0 | 0.143 | 99.9 | 10 | Urea | 0.1 | 90 | 4 | 7 |
| J | *nd/3.5/0 | B | PAN | 0.54 | 13.4 | 0.356 | 99.9 | 10 | Urea | 1 | 90 | 4 | 7.8 |
| K | *nd/3.5/0 | B | PAN | 0.55 | 13.7 | 0.269 | 99.8 | 10 | Urea | 1 | 90 | 4 | 7.8 |

*nd = not determined;
*nd followed by numbers = nominal maximum value, not confirmed with neutron activation analysis Ex 63

Preparation with Subsequent Addition of Re Component by Incipient Wetness

Place 5.0 g of the washed and dried solids of Ex 1 in an empty dish. Dropwise add, with concurrent hand stirring using a spatula to promote even wetting, 7.5 ml of a solution containing 0.034 g of HReO$_4$. Continue stirring after completing addition of the aqueous solution for two to four minutes to yield a batch of homogenized, wetted SiO$_2$.

Air dry the homogenized, wetted SiO$_2$ in a fume hood at ambient temperature (nominally 25° C.) overnight, then dry it in a forced air oven operating at a set point temperature of 110° C. for a period of two hours to provide a batch of dried, impregnated SiO$_2$.

Convert 2.75 g of the dried, washed solids to a reduced, activated catalyst as in Ex 1, but use a set point temperature of 175° C. rather than 200° C. After reduction, the solid contains 0.93 wt percent Pt and 0.48 wt percent Re as determined by neutron activation analysis. It exhibits a CO adsorption of 0.45 cc/g, which corresponds to a percent dispersion of 41.7 percent. It provides a measured hydrogenation rate of 0.185 moles of aromatic rings per hour per gram of catalyst.

Ex 64 through Ex 74

Replicate Ex 63 with changes as shown in Table V below.

Ex 63 through Ex 74 demonstrate that Re addition can be carried out in a second impregnation step producing catalysts of moderate activity. Hucul (U.S. Pat. No. 6,376,622) suggests that rhenium (Re) functions as a deactivation resistant component of, for example, a Pt catalysts used for polymer hydrogenation. These data show that the two-step preparation of Pt/Re catalysts can provide high Pt dispersions and reasonable catalytic activities, while incorporating the deactivation resistance provided by Re.

TABLE V

| Ex | % Pt/% Re | SiO$_2$ | Pt Salt | CO Ads | % Disp | Hydrogenation Activity | % Hyrogenation Via UV |
|---|---|---|---|---|---|---|---|
| 63 | 0.93/0.48 | A | CPA | 0.45 | 41.7 | 0.185 | 99.9 |
| 64 | 0.87/0.49 | C | CPA | 0.51 | 50.8 | *nd | *nd |
| 65 | 0.91/0.5 | D | CPA | 0.56 | 53.8 | *nd | *nd |
| 66 | 0.95/0.48 | E | CPA | 0.56 | 51.8 | 0.201 | 99.5 |
| 67 | 0.95/0.48 | B | CPA | 0.50 | 45.8 | 0.128 | 99.8 |
| 68 | 1.63/0.97 | A | CPA | 1.00 | 54.0 | 0.275 | 99.8 |
| 69 | 1.48/0.99 | C | CPA | 0.86 | 50.4 | *nd | *nd |
| 70 | 1.36/0.95 | D | CPA | 0.82 | 52.4 | *nd | *nd |
| 71 | 1.35/0.93 | E | CPA | 0.71 | 46.1 | *nd | *nd |
| 72 | 1.40/0.93 | B | CPA | 0.87 | 54.3 | 0.174 | 99.6 |
| 73 | 0.95/0.52 | F | CPA | 0.48 | 43.7 | 0.188 | 99.8 |
| 74 | 2.0/1.0 | F | CPA | 1.00 | 43.7 | 0.280 | 99.9 |

*nd = not determined;

What is claimed is:

1. A method for preparing a heterogeneous hydrogenation catalyst that comprises a Group VIII A metal and a catalyst support via aqueous deposition precipitation, the method comprising:
   a. preparing a wetted silica catalyst support via aqueous deposition precipitation by precipitating, at a temperature of at least 60 degrees centigrade, a Group VIII A metal precursor from an aqueous solution of the Group VIII A metal precursor onto a silica catalyst support, the aqueous solution having a pH within a range of from 8 to 12, the wetted silica catalyst support having the Group VIII A metal precursor deposited on, and dispersed across, catalyst support surfaces;
   b. converting the wetted silica catalyst support to a dried silica catalyst support; and
   c. subjecting the dried silica catalyst support to a reducing atmosphere under conditions sufficient to convert the Group VIII A metal precursor to its metallic state, wherein the reduced Group VIII A metal has a percent dispersion of at least 25 percent and the catalyst has a hydrogenation activity of at least 0.1 moles of aromatic rings per hour per gram of catalyst.

2. The method of claim 1 further comprising intermediate sequential steps b1. and b2. that succeed step b. and precedes step c., step b1. comprising wetting the dried silica catalyst support with an aqueous solution of a deactivation-resistant metal precursor to produce a homogenized, wetted catalyst support, and step b2. converting the homogenized, wetted catalyst support to a dried, impregnated catalyst support.

3. The method of claim 2, wherein the deactivation-resistant metal is rhenium and the deactivation-resistant metal precursor is perrhenic acid.

4. The method of claim 1, wherein the Group VIII A metal is platinum and the Group VIII A metal precursor is a water-soluble platinum salt.

5. The method of claim 1, wherein the aqueous solution of step a. further comprises a promoter metal precursor.

6. The method of claim 1, wherein the catalyst support has a pore size distribution of from 300 Angstroms to 10,000 Angstroms.

* * * * *